United States Patent [19]
Okazaki

[11] Patent Number: 5,506,735
[45] Date of Patent: Apr. 9, 1996

[54] MAGNETIC DISK DRIVE HAVING PROGRAMMABLE SECTOR PULSE GENERATOR AND PROCESSOR DETERMINED TRACK ZONES

[75] Inventor: Akifumi Okazaki, El Toro, Calif.

[73] Assignee: Kabushiki Kaisha Toshiba, Kanagawa, Japan

[21] Appl. No.: 280,242

[22] Filed: Jul. 25, 1994

Related U.S. Application Data

[63] Continuation of Ser. No. 642,181, Jan. 16, 1991, abandoned.

[51] Int. Cl.$^6$ ............................ G11B 21/02; G11B 5/596
[52] U.S. Cl. ..................... 360/75; 360/77.04; 360/77.05; 360/77.08
[58] Field of Search ........................... 360/77.08, 78.14, 360/77.04, 77.05, 61, 64, 68, 75

[56] References Cited

U.S. PATENT DOCUMENTS

| | | | |
|---|---|---|---|
| 4,488,187 | 12/1984 | Alaimo | 360/77.08 |
| 5,012,363 | 4/1991 | Mine et al. | 360/77.08 |
| 5,109,307 | 4/1992 | Sidman | 360/77.08 |
| 5,307,218 | 4/1994 | Kitamura et al. | 360/77.08 |

Primary Examiner—Timothy P. Callahan
Assistant Examiner—Trong Phan
Attorney, Agent, or Firm—Loeb and Loeb

[57] ABSTRACT

In a magnetic disk drive system in which a transducer addresses a plurality of tracks on a rotating magnetic disk, a programmable sector pulse generator responds to rotation of the magnetic disk and to an indication of the location of a track to be addressed by the transducer to generate sector pulses identifying a succession of sectors along the track. The indication of location of the track is provided by a central processing unit which divides the tracks into a plurality of concentric zones and then programs the sector pulse generator to execute different counts of timing pulses derived from the rotating magnetic disk in accordance with the particular zone in which the selected track is located. The central processing unit determines the zone of the selected track by counting track crossings of the transducer relative to a reference track, thereby eliminating the need to record zone identifying information in the tracks. The programmable sector pulse generator responds to a track seek command identifying a track in a different zone by changing the count in connection with sector pulse generation within a small fraction of the time required for the magnetic disk to undergo a revolution.

15 Claims, 9 Drawing Sheets

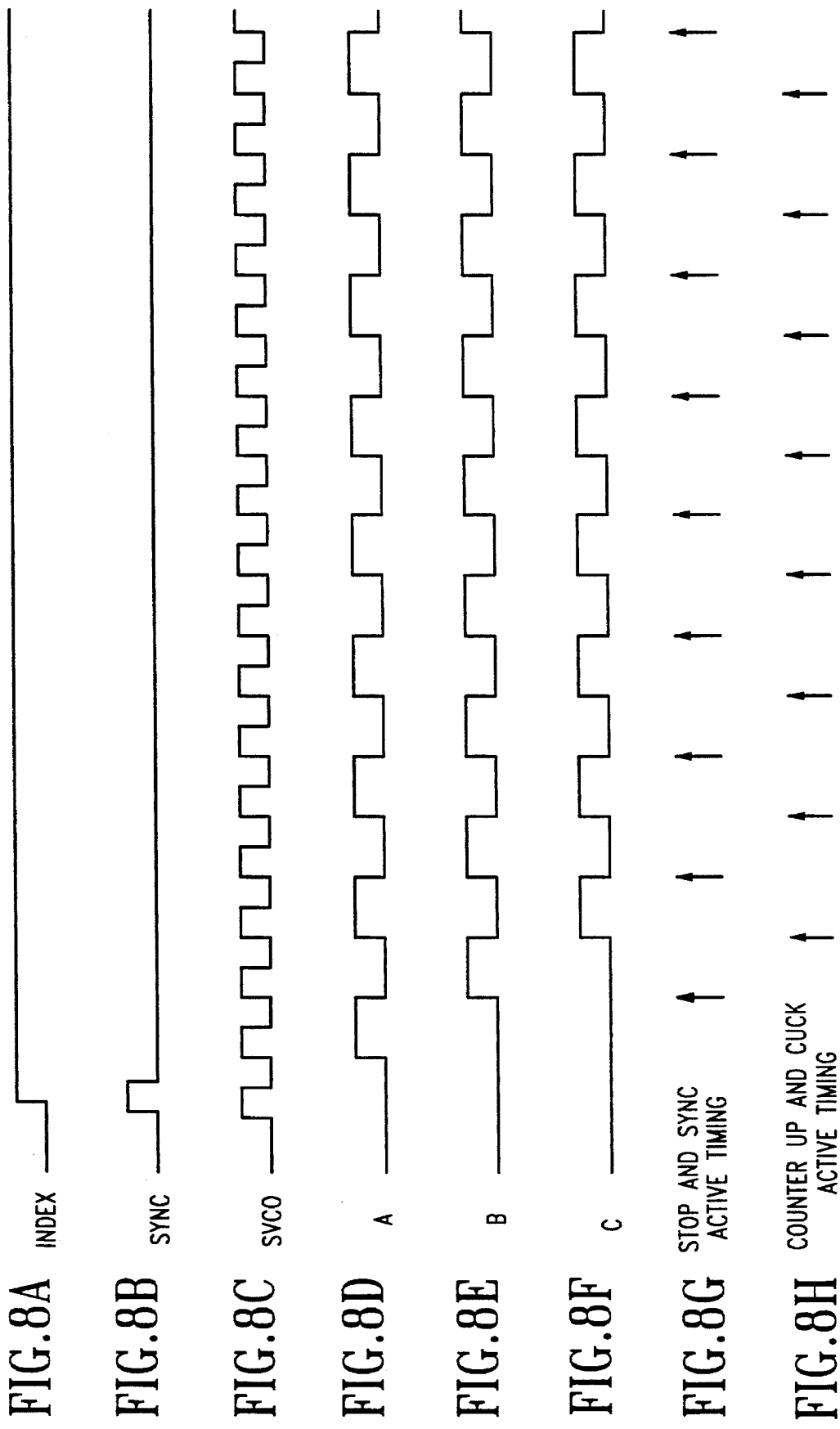

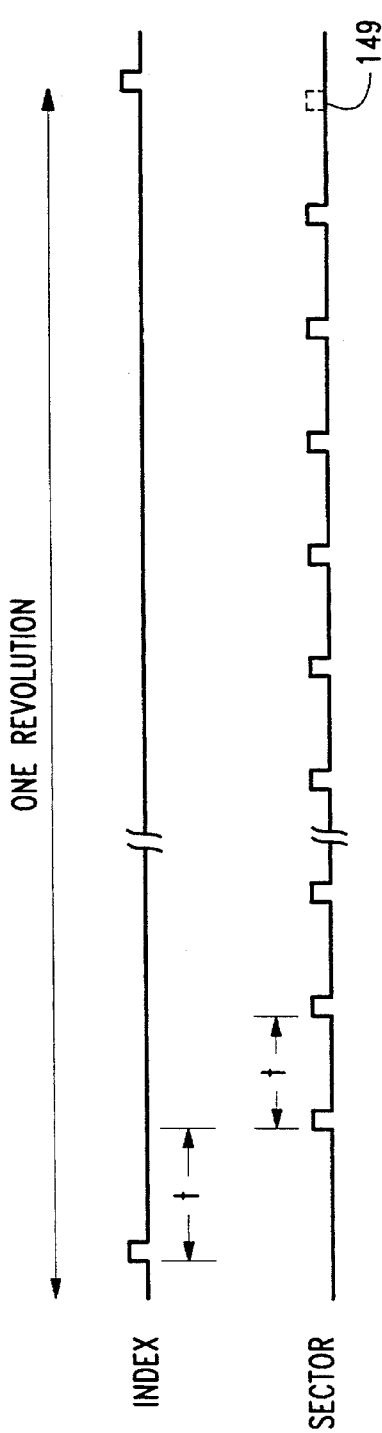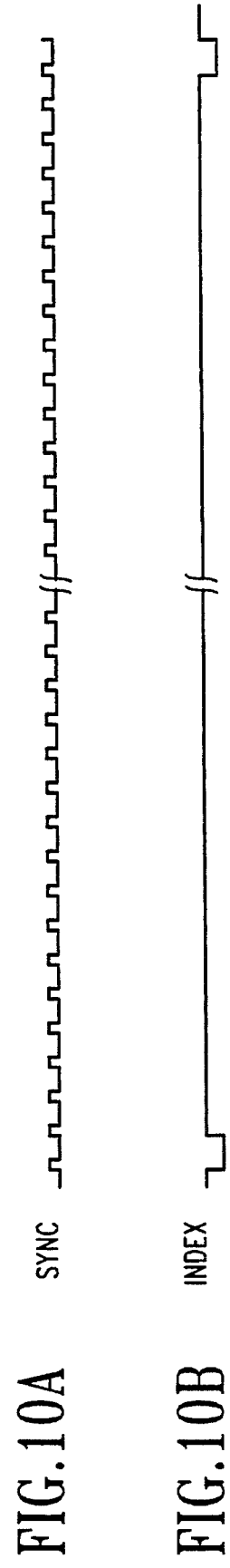
FIG.9A INDEX
FIG.9B SECTOR
FIG.10A SYNC
FIG.10B INDEX

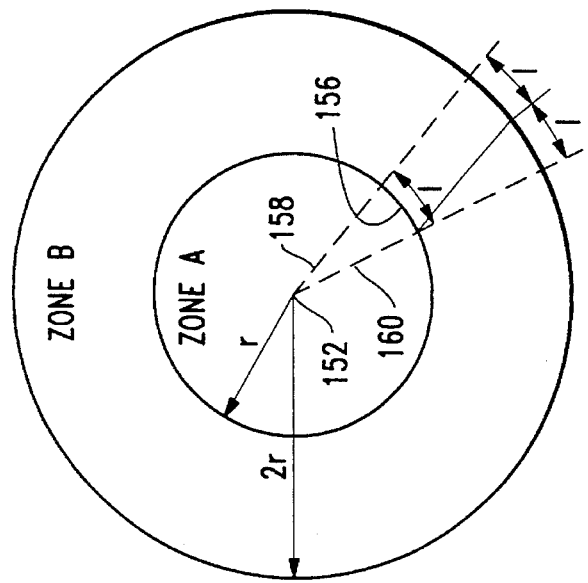
FIG. 11
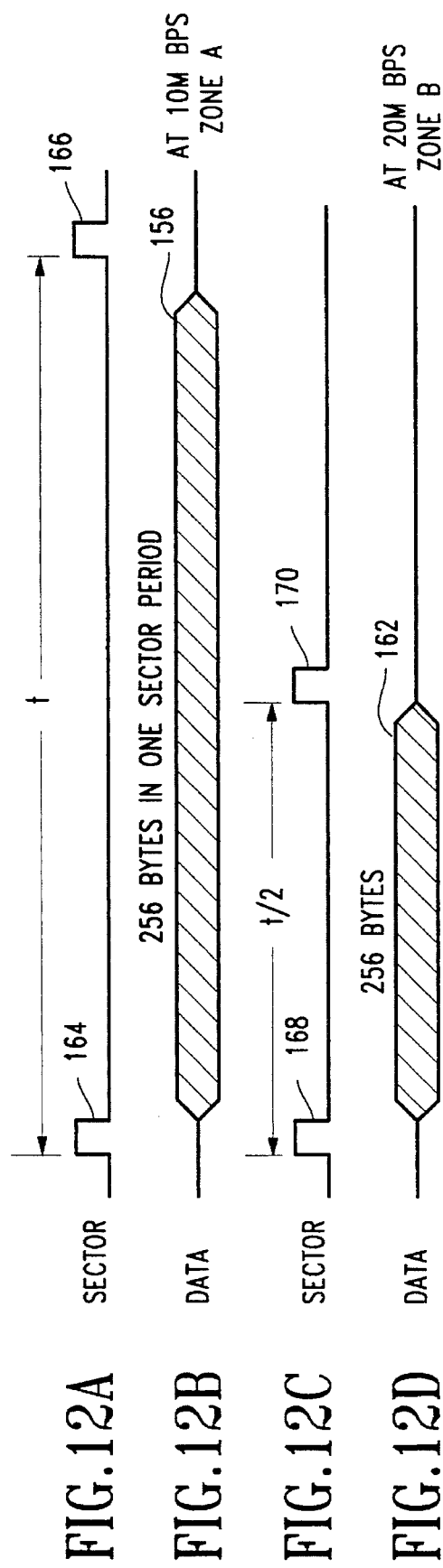
FIG.12A
FIG.12B
FIG.12C
FIG.12D

MAGNETIC DISK DRIVE HAVING PROGRAMMABLE SECTOR PULSE GENERATOR AND PROCESSOR DETERMINED TRACK ZONES

This is a continuation of application Ser. No. 07/642,181, filed Jan. 16, 1991, now abandoned.

BACKGROUND OF THE INVENTION

1. Field of the Invention

The present invention relates to magnetic disk drive systems, and more particularly to magnetic disk drive systems in which read/write locations on a rotating magnetic disk are identified by dividing a plurality of tracks on the disk into different concentric zones and establishing a succession of sectors along each track with sector length being different in the different zones.

2. Description of Related Art

It is well known in the field of magnetic disk drives to identify desired locations on one or more magnetic disks by dividing the tracks on the disk into a plurality of different concentric zones. Each track is also divided into a succession of sectors of equal length. The size (arcuate extent) of the sectors within each zone is different from the sizes of the sectors in the other zones. This is because, for a given recording density along the tracks of the magnetic disk, a data field of standard length requires a larger sector for tracks closer to the center of the disk than in the case of tracks further away from the disk center and closer to the outer edge thereof. Thus, the standard length field in a track relatively close to the center of a disk may require a sector which is as much as two times the size of the sector required by the same field recorded at the same density but in a track close to the outer edge of the magnetic disk. For this reason, it is common to define sectors which increase in arcuate size from the outermost track to the innermost track on the disk so as to obtain a generally uniform linear length for each sector and thereby achieve maximum recording density. For convenience, the disk is typically divided into a plurality of zones, with the tracks lying in each zone having a given sector size different from the sector size in the other zones. This is commonly referred to as constant density recording.

Various different schemes are used to identify the sectors within the tracks as the transducer is caused to address different tracks in response to track seek commands. One common technique uses timing signals generated in response to rotation of the magnetic disk as a reference to define the rotational position of the disk at any given instant. Servo burst signals or other track following signals recorded within the tracks of a dedicated servo disk, for example, are used to generate sync pulses as the disk rotates. The generation of such pulses in conjunction with an index pulse generated at the start of each revolution provides timing signals useful in determinating rotational position as the disk rotates. This information, in turn, is used to generate pulses which identify the sectors of a selected track when combined with a determination of the zone in which the track is located. The zone of the selected track is typically determined by sensing small fields of information recorded within the servo tracks which identify or define the zone in which the track is located. This information together with the timing signals provided in response to rotation of the magnetic disk enables the determination of sector location within the various tracks.

The arrangements just described are not without their disadvantages. Each different zone typically requires a different timing circuit in order to identify the sectors within such zone in response to the timing information. Such timing circuit may, for example, include a counter for counting the sync pulses generated by rotation of the disk. The counter counts down by a predetermined count before generating a sector pulse, following which the process is repeated. This is because the number of sync pulses generated in correspondence to each sector is fixed for each particular zone. Because a different counter and associated circuitry are required for each zone, the hardware requirements for the disk drive may be substantial. This is particularly true in cases where a relatively large number of zones are used in order to maximize use of the recording surface of the disk. In such instances, the space and cost requirements can be quite substantial.

A further problem arises in such disk drive systems due to the fact that the zones are typically preselected with the system thereafter being designed and built in a somewhat permanent fashion. For example, a system using disks of given size and recording density capability for a particular type of operation may dictate the establishment of a predetermined number of zones encompassing selected groups of tracks on the disk. The system is then built on this basis with the counting circuitry being hard-wired in accordance with the preselected zones. The system thereafter requires such zone pattern, and is not easily changed.

Typically, once the zones are established in such magnetic disk systems, a small field which identifies the zone is then periodically recorded on each servo track. During use, the magnetic transducer reads the identifying data when addressing a particular track so that the zone in which the track is located is identified. Because of this, considerable time and effort are required to record the tracks on the servo disk. Should it be desired to change the number of zones or the zone configuration on the disk or disks of the system, considerable effort is required to re-record the servo information.

A still further problem resides in the operations necessary to respond to each new track seek command. The timing circuitry for generating the sector pulses, for example, may require that the system await the next index pulse so that the circuitry can be properly synchronized. Relocation of the magnetic transducer to another track and sector, particularly within a different zone, may be complicated in other respects as well.

It would therefore be desirable to provide an improved magnetic disk drive system. Such an improved disk drive system should desirably be capable of implementing a multi-zone disk layout without the need for space consuming and costly hardware, particularly in instances where a relatively large number of zones are used. It would also be desirable to be able to vary the number and layout of the zones within a given system without making hardware changes. It would furthermore be desirable to eliminate the need for recording zone identifying information within the servo tracks. This would make the recording of the servo tracks relatively easy, both initially and upon changing the zone configuration within an existing design.

BRIEF SUMMARY OF THE INVENTION

Magnetic disk drive systems in accordance with the invention utilize a programmable sector pulse generator for defining or identifying the succession of sectors within the different tracks on a magnetic disk. The programmable sector pulse generator responds to rotation of the magnetic disk and to an indication of the location of a track (typically a zone) to be addressed by the transducer to generate sector pulses defining the sectors along the track. The programmable sector pulse generator executes different counts for the different zones. Consequently, only one such component is needed rather than a plurality of dedicated counters. Moreover, because the sector pulse generator is programmable, the number and the configuration of the zones within the disk can be changed at any time without having to physically change the sector pulse generator. A central processing unit divides the tracks into the plurality of concentric zones and then programs the programmable sector pulse generator to execute the different counts of timing pulses derived from the rotating magnetic disk in accordance with the particular zone in which a selected track is located.

In accordance with the invention, the need to record zone identifying information within the tracks on the servo disk is eliminated. Instead, the central processing unit determines the zone in which a selected track is located. The central processing unit does this by counting track crossings of the transducer relative to a reference track on the disk.

In accordance with the invention, each new track seek command is executed quickly and properly synchronized sector pulses can be generated for a new zone without the need to await the occurrence of the next index pulse at the end of the disk revolution. The programmable sector pulse generator responds to a track seek command identifying a track in a different zone by changing the count in connection with sector pulse generation. This is accomplished within a fraction of the time required for the magnetic disk to undergo a revolution.

In a preferred embodiment of a magnetic disk system in accordance with the invention, a plurality of ganged magnetic transducers for addressing like locations on a dedicated servo disk and on a plurality of data disks are coupled to a central processing unit through read/write controls which function to position the transducers at desired tracks on the respective disks. The central processing unit functions in combination with a programmable sector pulse generator to define a plurality of different zones among the tracks on the disks and the variable size sectors which occur within such zones. The central processing unit determines the zone of each track to be addressed, and programs the programmable sector pulse generator to repeatedly count a selected amount in response to timing signals derived from the tracks of the servo disk to generate the sector pulses which define the sectors along the desired track. The central processing unit determines the track being addressed and thereby the zone of that track by counting track crossings of the transducer at the servo disk relative to a reference track adjacent the outer edge of the servo disk. Consequently, there is no need to record zone identifying data within the tracks of the servo disk. Because the information recorded within the tracks of the servo disk consists of like servo bursts or track following data, the servo disk can be used with various different zone configurations as determined by the central processing unit.

In a preferred embodiment of the programmable sector pulse generator, a counter counts timing pulses derived from rotation of the servo disk, and a comparator compares the count with information stored in a full adder. The full adder functions in combination with a latch to determine the count for each sector based on information loaded by the central processing unit. At the beginning of each new sector as determined by the counter having counted by the predetermined count, the comparator causes a sector pulse to be generated. A flip flop and a further latch coupled in association with the full adder and the comparator function to change the count in a rapid, efficient manner in response to a track seek command from the central processing unit identifying a track within a different zone. A still further latch which responds to information from the central processing unit representing the permissible number of sector pulses within a complete revolution of the magnetic disk, functions in combination with a further comparator which is also coupled to the counter to inhibit the generation of further sector pulses until the counter has been reset by an index pulse at the start of the next revolution of the disk.

BRIEF DESCRIPTION OF THE DRAWINGS

A better understanding of the invention may be had by reference to the following specification in conjunction with the accompanying drawings, in which:

FIGS. 8A–8H are waveforms useful in explaining the operation of the programmable sector pulse generator of FIG. 6 and the clock generator of FIG. 7;

FIGS. 9A, 9B, 10A and 10B are waveforms useful in explaining the operation of the programmable sector pulse generator of FIG. 6;

FIG. 11 is a representation of a portion of a disk illustrating the manner in which sector size varies from zone to zone;

FIGS. 12A–12D are waveforms associated with the disk representation shown in FIG. 11.

DETAILED DESCRIPTION OF THE INVENTION

Figure 1:
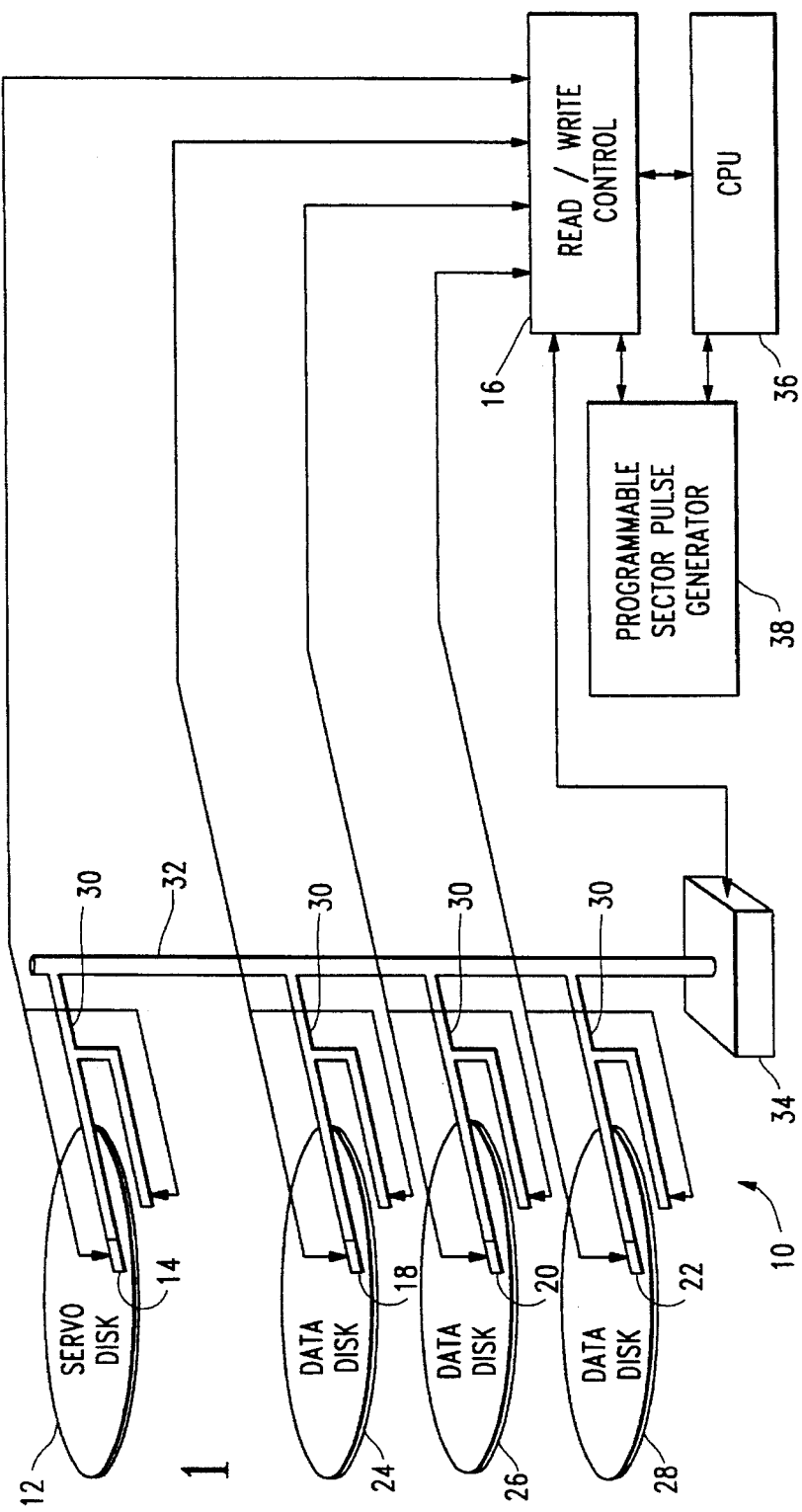
FIG. 1 is a partial perspective view and partial block diagram of a magnetic disk system in accordance with the invention.

FIG. 1 shows a magnetic disk drive system 10 in accordance with the invention. The disk drive system 10 includes a dedicated servo disk 12 having a plurality of servo tracks. The servo tracks are addressed by a magnetic transducer 14 which is coupled to a read/write control 16. The read/write control 16 is also coupled to magnetic transducers 18, 20 and 22 which respectively address tracks on data disks 24, 26 and 28. The magnetic transducers 14, 18, 20 and 22 are mounted on arms 30 which are mounted on a common shaft 32 for ganged movement by an actuator 34 controlled by the read/write control 16. In this manner, the magnetic transducers 14, 18, 20 and 22 move together to address like locations along corresponding tracks on the servo disk 12 and the data disks 24, 26 and 28.

The disk drive system 10 of FIG. 1 includes a central processing unit (CPU) 36 which is coupled to the read/write control 16 and which controls the disk drive system 10. The CPU 36 is also coupled to a programmable sector pulse generator 38, as is the read/write control 16.

In accordance with the invention, the programmable sector pulse generator 38 which receives timing signals generated in response to rotation of the servo disk 12 is programmed by the CPU 36 to identify or define successive sectors along the tracks of the disks 12, 24, 26 and 28. The size of the sector is determined in accordance with a plurality of different zones of the tracks as defined by the CPU 36. As will be described subsequently, the programmable sector pulse generator 38 includes a counter which is programmed to execute different counts corresponding to the size of the sectors within different zones of the tracks as determined by the CPU 36.

Also in accordance with the invention, the CPU 36 keeps a record of the radial location of the magnetic transducer 14 (and thus the transducers 18, 20 and 22) by detecting track crossings relative to a reference track adjacent the outer edge of the servo disk 12. In this fashion the CPU 36 maintains a record of the particular tracks being addressed by the magnetic transducers 14, 18, 20 and 22 at all times, so that the zone containing the addressed track and the corresponding sector size are available within the CPU 36 as it controls the programmable sector pulse generator 38. This eliminates the need to record zone data on the tracks of the servo disk 12 identifying the zone of each track.

Figure 2:
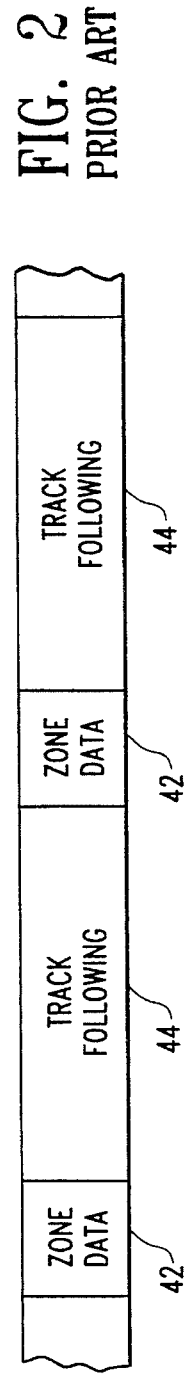
FIG. 2 is a representation of a conventional arrangement of zone identifying and track following data recorded along the servo tracks of a magnetic disk.

FIG. 2 illustrates a portion of a servo track of conventional magnetic disk systems. The track includes zone data fields 42 interspersed with track following information 44. The zone data fields 42 typically contain binary information identifying the zone of the servo track. The track following information 44 contains high frequency servo bursts which enable the servo transducer to follow the track.

Figure 3:
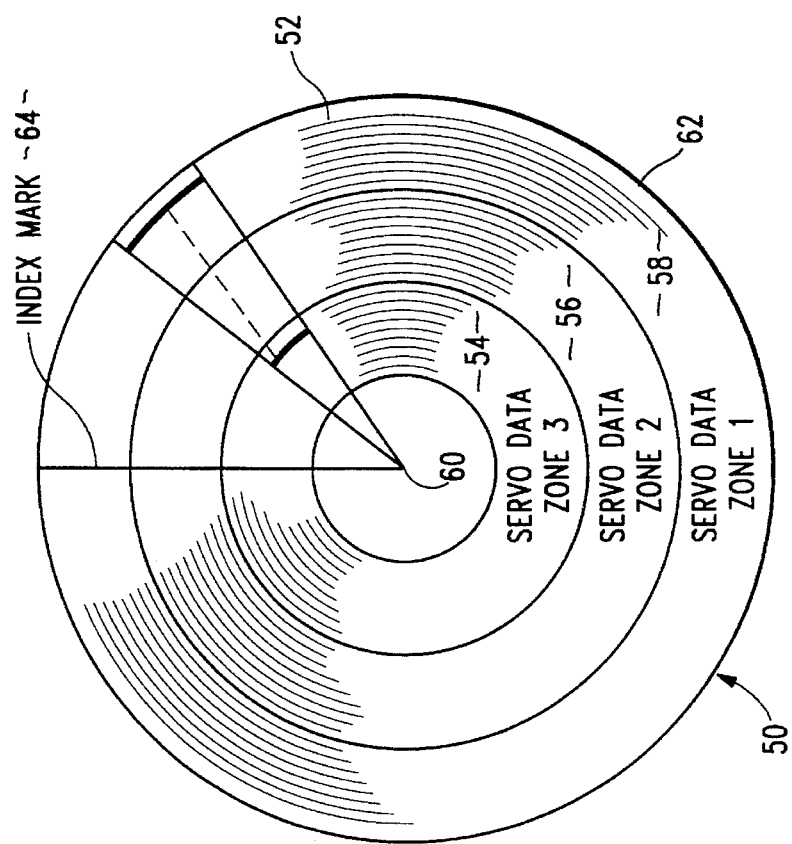
FIG. 3 depicts a servo disk with the tracks thereof divided into three different zones in conventional fashion.

FIG. 3 shows a conventional servo disk 50. The servo disk 50 has a plurality of circular concentric servo tracks 52 of the type shown in FIG. 2. Only portions of certain ones of the servo tracks 52 are shown in FIG. 3 for simplicity of illustration. The servo tracks 52 are organized into three different concentric zones 54, 56 and 58 on the servo disk 50. The first such zone 54 is disposed adjacent a center 60 of the servo disk 50. The second such zone 56 is disposed outside of the zone 54. The third such zone 58 is disposed outside of the zone 56 and just inside of an outer edge 62 of the servo disk 50. The tracks contain zone data fields such as the fields 42 of FIG. 2 which identify the respective zones. That is, the information recorded on the servo disk varies from zone to zone. With the zones identified in this fashion, a disk drive system can generate sector pulses of appropriate period for each zone to provide sectors of desired length for associated data disks. An example of a conventional sector pulse generating arrangement which may be used to generate the sector pulses in connection with the servo disk 50 of FIG. 3 is described hereafter in connection with FIG. 13.

The servo disk 50 is provided with an index mark 64 extending along a radius thereof. Each time the index mark 64 passes a magnetic transducer addressing the servo disk 50, an index pulse is generated. The index pulses denote the start of each revolution of the servo disk 50 and are useful in providing timing information. Index pulses may also be generated directly from the motor used to rotatably drive the servo disk 50.

The servo disk 50 of FIG. 3, which is of conventional design, can be used with disk drive systems according to the invention such as for the servo disk 12 in the disk drive system 10 of FIG. 1. If the servo disk 50 is used as the servo disk 12 in the disk drive system 10 of FIG. 1, then the CPU 36 can determine the zone of a track being addressed directly from the zone data fields 42 of such track in programming the programmable sector pulse generator 38 to define the sectors along the track. However, and in accordance with the invention, the servo disk 12 of the disk drive system 10 of FIG. 1 need not be capable of identifying the zones, inasmuch as the CPU 36 performs this function by detecting track crossings, as previously noted. This enables use of a much simpler servo disk 80 shown in FIG. 4.

Figure 4:
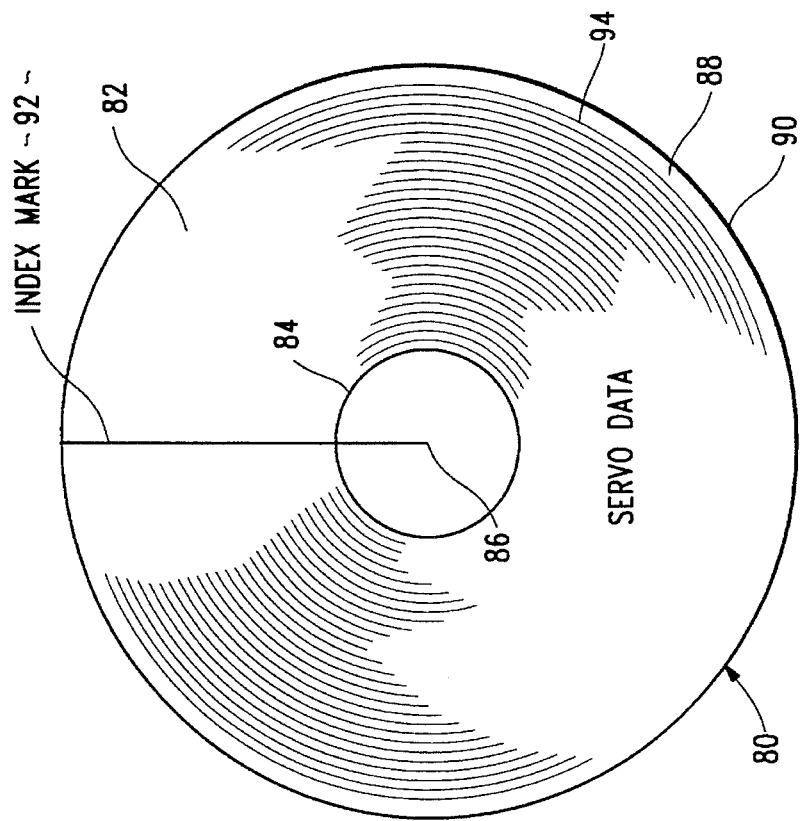
FIG. 4 depicts a servo disk according to the invention on which the zones are variable and are defined by the electronics of the system of FIG. 1.

Like the servo disk 50 of FIG. 3, the servo disk 80 of FIG. 4 has a plurality of servo tracks 82 extending from an inner circumference 84 adjacent a center 86 of the servo disk 80 to an outer circumference 88 adjacent an outer edge 90 of the servo disk 80. Unlike the servo disk 50 of FIG. 3, however, the servo disk 80 of FIG. 4 is not pre-divided into the different zones, inasmuch as this function is performed by the CPU 36. Accordingly, the tracks 82 include only servo burst track following information (and an index mark). Consequently, the information recorded along each of the tracks 82 is the same, and it is not necessary to record the zone data fields 42 or similar information identifying the different zones. Like the servo disk 50 of FIG. 3, the servo disk 80 of FIG. 4 has an index mark 92 extending along a radius to facilitate the generation of an index pulse once per rotation of the disk.

In the case of the servo disk 80 of FIG. 4, the CPU 36 divides the tracks 82 into zones (thereby defining zones on the data disks 24–28) by programming the programmable sector pulse generator 38. By way of example, a 3½ inch disk typically has about 1400 tracks. The CPU 36 divides the approximately 1400 tracks into a selected number of zones; typically 3 to 8 zones. Again, there is no need to record zone identifying information within the tracks 82. The CPU 36 is programmed such that each of the tracks 82 is assigned to a particular zone. The CPU 36 determines the zone of a track being addressed by the magnetic transducer 14 by knowing the identity of the track. The servo tracks 82 on the servo disk 80 include an outermost or reference track 94 at the outer circumference 88 adjacent the outer edge 90 of the servo disk 80. During initialization, the transducer 14 moves to the track 94. Thereafter, the CPU 36 detects track crossings as the magnetic transducer 14 moves inwardly from the reference track 94, and in this manner identifies the track and thereby the zone of the track being addressed by the magnetic transducer 14.

Figure 5:
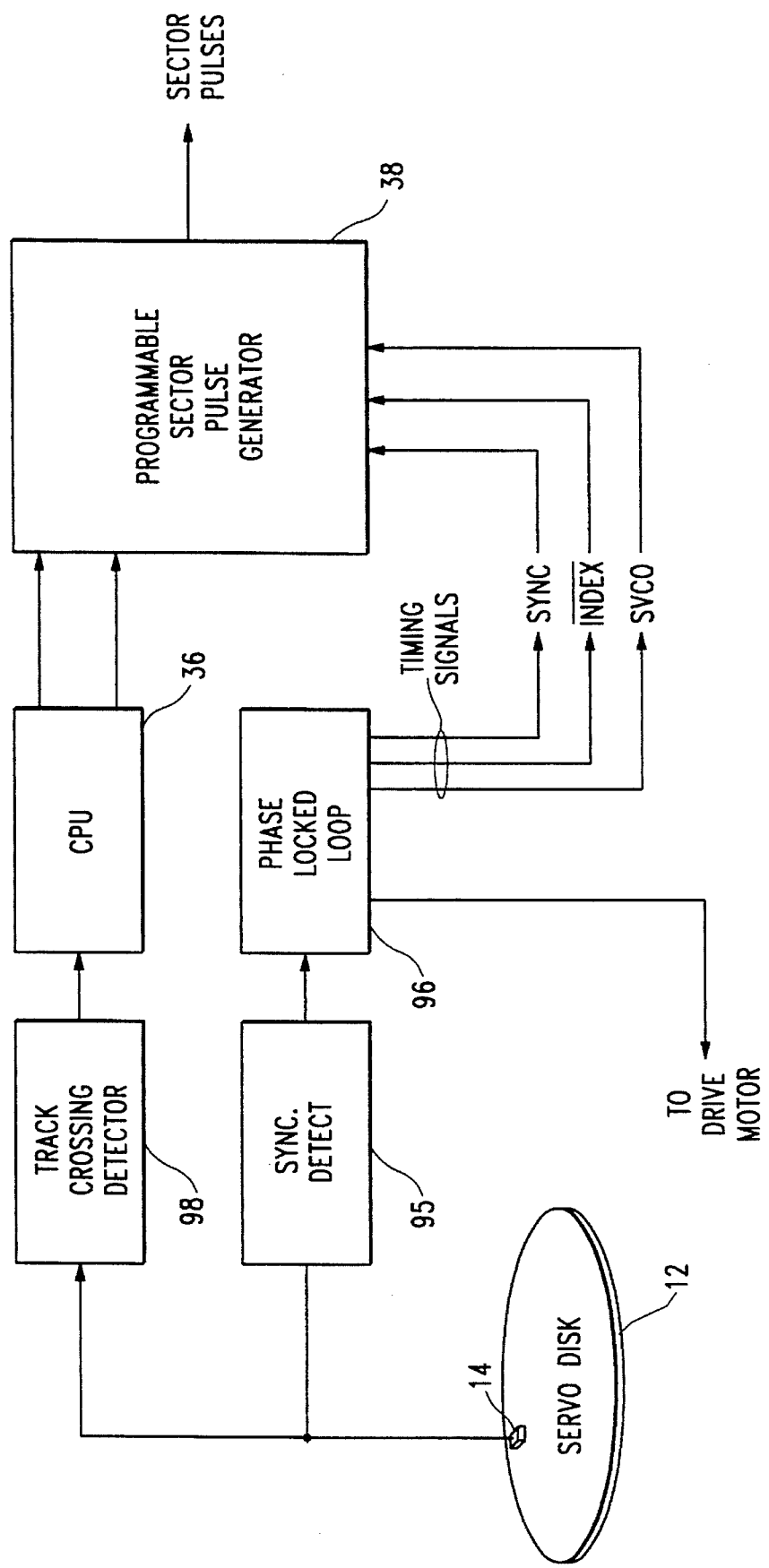
FIG. 5 is a block diagram showing a portion of the system of FIG. 1 in greater detail.

FIG. 5 shows a portion of the disk drive system 10 of FIG. 1 in greater detail. As shown in FIG. 5, the magnetic transducer 14 of the servo disk 12 is coupled to the programmable sector pulse generator 38 through a sync detector 95 (which converts analog signals from the transducer 14 into a digital pulse train) and a phase locked loop 96. As the servo disk 12 rotates relative to the magnetic transducer 14, the information recorded along the track being addressed by the magnetic transducer 14 generates a series of sync pulses which represent successive rotational positions of the servo disk 12 and which are provided to the phase locked loop 96. The phase locked loop 96 responds by generating a motor drive signal to drive the disk motor at the desired speed and timing signals which are provided to the programmable sector pulse generator 38 and which provide a continuing reference of the rotational position of the servo disk 12.

As shown in FIG. 5, the system includes a track crossing detector 98 which senses each track crossing of the magnetic transducer 14 as the transducer 14 moves inwardly from the reference track 94 adjacent the outer edge 90 of the servo disk 80 shown in FIG. 4. The track crossing detector may be, for example, an amplitude threshold detector for detecting transitions between recorded tracks and blank bands between tracks. By detecting each crossing of one of the tracks 82, the CPU 36 is continuously able to identify the particular one of the tracks 82 addressed by the magnetic transducer 14. The CPU 36 in turn provides zone information for the particular track being addressed by the magnetic transducer 14 to the programmable sector pulse generator 38 in order to identify the successive sectors along the track.

Each time a track seek command occurs identifying a new one of the servo tracks 82 to be addressed by the magnetic transducer 14, the CPU 36 provides appropriate inputs to the programmable sector pulse generator 38 so that the desired sector pulses corresponding to the zone in which the target track is located can be generated, in addition to sending a relocation command through the read/write control 16 to the actuator 34 to position the magnetic transducer 14 on the particular one of the servo tracks 82 being sought.

Figure 6:
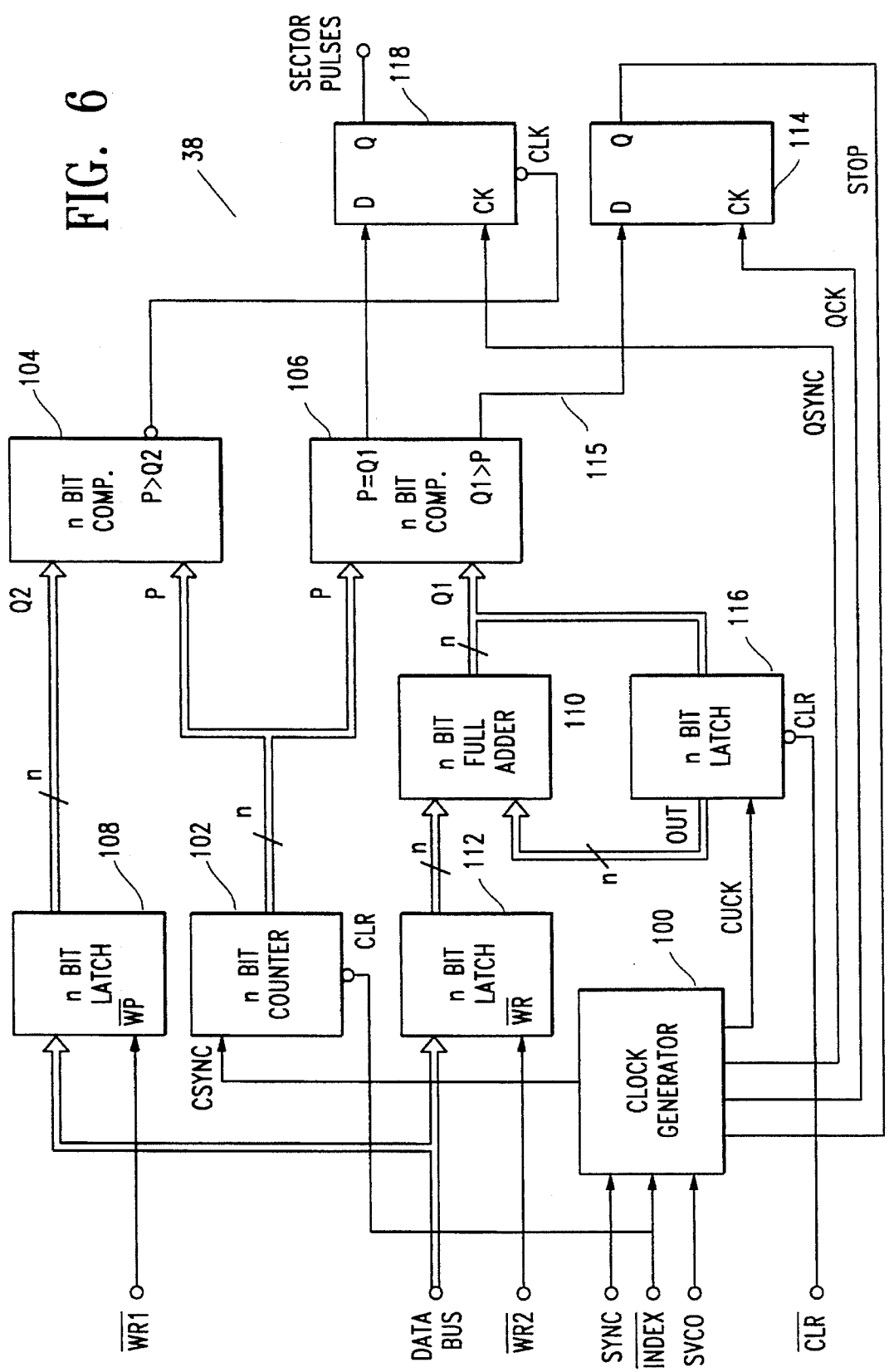
FIG. 6 is a block diagram of the programmable sector pulse generator in the system of FIG. 1.

The programmable sector pulse generator 38 is shown in detail in FIG. 6. The programmable sector pulse generator 38 includes a clock generator 100 for receiving $\overline{\text{INDEX}}$ pulses, SYNC pulses and SVCO pulses from the phase locked loop 96 shown in FIG. 5. The clock generator 100 is shown in detail in FIG. 7, and the $\overline{\text{INDEX}}$, SYNC and SVCO signals are shown and described in connection with FIGS. 8A–8C. The $\overline{\text{INDEX}}$ signal is generated by the phase locked loop 96 from the index mark 92 as detected by the sync detector 95 in cooperation with the transducer 14, to denote the beginning of each revolution of the servo disk 80. The SYNC pulses are generated by the phase locked loop 96 from the track following information recorded along the servo tracks 82, as detected by the sync detector 95 in cooperation with the transducer 14. The SVCO pulses are generated by the phase locked loop 96 at a frequency which is a multiple of the SYNC pulse frequency, as will be described subsequently. The clock generator 100 functions to generate CSYNC, QSYNC, QCK and CUCK signals, as will be described in connection with FIG. 7.

The basic function of the circuit of FIG. 6 is to generate equally spaced sector pulses of a desired length depending upon the zone within which the tracks being read are located. This is accomplished by programming a count value by means of an n bit full adder 110 and n bit latches 112 and 116 to provide a programmed count corresponding to the count value at which successive sector pulses are to be generated, and counting pulses corresponding to rotation of the servo disk by means of an n bit counter 102. The actual count is compared to the programmed count by means of an n bit comparator 106, the output of which is used to control the generation of a sector pulse. The programmed count value is then incremented to set a count value corresponding to the next succeeding sector pulse. In addition, an additional n bit comparator 104 and n bit latch 108 are provided to inhibit production of the final sector pulse of a revolution, as will be described subsequently. Sector pulses of different length or different zones are generated by providing different programmed count values from the CPU 36.

The CSYNC signals from the clock generator 100, which represent rotational increments of the servo disk 12, are provided to the counter 102 which is cleared or reset by each $\overline{\text{INDEX}}$ pulse. The output of the counter 102 is provided to one input of the comparator 104 and also to one input of the comparator 106. A second input of the comparator 104 is provided by the latch 108 which receives data from the CPU 36 along the data bus in response to a write signal $\overline{\text{WR1}}$, also from the CPU 36. A second input of the comparator 106 is provided by the output of the full adder 110. The full adder 110 receives an input from the latch 112 coupled to receive data from the CPU 36 in response to a write signal $\overline{\text{WR2}}$ from the CPU 36.

The CPU 36 contains data corresponding to the number of sector pulses per revolution necessary for each of the different zones. More specifically, the CPU contains count values corresponding to the different sized sectors and provides them to the latches 112 and 108 via the data bus. Upon the initiation of a track seek operation, the write control signals $\overline{\text{WR1}}$ and $\overline{\text{WR2}}$ are generated in sequence to cause the latches 108 and 112 to be loaded with data on the data bus. At the time the $\overline{\text{WR2}}$ signal is generated, the CPU places a value on the data bus corresponding to a desired count value for each sector for the zone within which the target track is located. This value is thus latched into the latch 112. When the $\overline{\text{WR1}}$ signal is generated, the CPU provides data on the data bus corresponding to a maximum count and loads it into the latch 108. The purpose of this latch will be discussed subsequently.

The counter 102 counts CSYNC pulses from the clock generator 100 as the servo disk 12 rotates. The output of the counter is provided as a value P to the comparator 106. The full adder 110 which receives values from the latch 112 and the latch 116 provides a second value Q1 which is applied to a second input of the comparator 106 for comparison with the value P from the counter 102.

The operation of the circuit of FIG. 6 will be described with reference to the receipt of the $\overline{\text{INDEX}}$ signal signifying the beginning of a revolution of the disk 14. At this point the counter 102 is cleared and will begin counting CSYNC pulses. In addition, the latch 116 is cleared by the control signal $\overline{\text{CLR}}$ from the CPU and the value held in the latch will initially be zero. The initial value at the output of the full adder 110 will therefore be equal to the value held in the latch 112. As the counter 102 counts, a low signal indicating Q1>P will initially be provided by the comparator 106 via a lead 115 to the D input of a flip flop 114 having a clock (CK) input coupled to receive a QCK signal from the clock generator 100. The output (Q) of the flip flop 114, which provides a STOP signal to the clock generator 100 when the D input thereto is high, responds to the low D input by not providing the STOP signal. As long as Q1>P, the STOP signal is absent, and this prevents the count up clock signal CUCK from being provided to the latch 116 coupled between the output and one of the inputs of the full adder 110.

When P becomes equal to Q1 (P=Q1), the comparator 106 provides an output signal to a flip flop 118 to provide the sector pulses at the output of the flip flop. A sector pulse occurs at the output of the flip flop 118 each time that P becomes equal to Q1.

When P is greater than Q1 at the inputs of the comparator 106, a high signal generated on the lead 115 to the flip flop 114 produces the STOP signal to the clock generator 100, which causes the count up clock signal CUCK to be provided to the latch 116. In response to the signal CUCK, the value Q1 is latched and the latch 116 produces at an output OUT thereof a signal corresponding to the value Q1. This signal is then added by the full adder 110 to the output of the latch 112 to produce a new value Q1 at the output of the full adder 110. The latching and adding continues in response to generation of the count up signal CUCK until Q1 becomes greater than P. When this occurs, the input to the flip flop 114 goes low and the flip flop stops providing the STOP signal to the clock generator 100, and the count up signal CUCK is terminated.

When the value Q1 again becomes greater than P, the counter 102 will continue to count up until P is again equal to Q1. At this point, a high output will be generated to the flip flop 118 and another sector pulse will be generated. With the next count of the counter 102, the value P will again exceed the current value Q1 and the STOP signal will again be generated by the flip flop 114. The CUCK signal will again cause the latch 116 to latch the output of the full adder 110. This value will be added to the contents of the latch 112, and the value Q1 will therefore again be incremented by the value contained in the latch 112. In this fashion, a sector pulse will be generated each time the counter 102 counts a number of pulses equal to the value which is contained in the latch 112. This counting and generation of sector pulses will continue until the count value P is greater than the value Q2 contained in the latch 108. This will cause the output of the comparator 104 to drive the clear (CLR) input of the flip flop 118 and inhibit the generation of a further sector pulse, until the next INDEX pulse occurs to clear the counter 102 and P again becomes less than Q2.

The purpose of the provision of the latch 108 and the comparator 104 is to prevent generation of the final sector pulse which would otherwise occur prior to the next INDEX pulse. This avoids the generation of a final sector pulse for which there is insufficient space between the sector pulse and the next INDEX pulse.

Thus, the counter 102 operates to count CSYNC pulses from INDEX signal to INDEX signal, and the count value is employed to generate sector pulses at predetermined count increments in accordance with the value set in the latch 112. The counter 102 is reset by each INDEX pulse so as to restart the counting process.

In generating sector pulses, the period (time duration) of sector pulse generation for a track contained in an inner servo zone may for example be twice the period of the sector pulses for a track contained in an outer servo zone in order to provide substantially equivalent linear sector length. In the described embodiment, the rate of rotation of the servo disk is 3,600 rpm, the SVCO signal occurs at the rate of 8 MHz, and there are 4,166 sync pulses in one revolution (the 8 MHz rate and 4,166 pulses are constant across the radius of the disk). A track in an inner zone may require 100 CSYNC pulses per sector pulse generation whereas a track in an outer zone may require 50 CSYNC pulses per sector pulse generation.

Referring again to FIG. 6 in the context of the present example, a track seek command to reposition the servo transducer from a track in the inner zone to a track in the outer involves a change in the number of CSYNC pulses to be counted from 100 to 50 for each sector pulse. The latch 116 is cleared, and the CPU 36 which previously set a count of 100 in the latch 112 sets a count of 50 in the latch 112. At the same time, the CPU 36 sets a count of 4,151 in the latch 108, representing the number of CSYNC pulses per disk revolution for the new zone. If the P input to the comparator 106 is greater than the Q1 input, then the flip flop 114 responds by providing the STOP signal to the clock generator 100 to provide generation of the count up clock signal CUCK. The CUCK signal latches the output of the full adder 110 into the latch 116. The output of the full adder 110 changes to equal the sum of the previous output of the full adder 110 and the output of the latch 112. This continues until the P input to the comparator 106 becomes less than the Q1 input. When this occurs, the STOP signal at the output of the flip flop 114 becomes low, and the clock generator 100 stops generating the count up signal CUCK. All the while this is occurring, the counter 102 is counting the CSYNC signals. When P becomes equal to Q1, a sector pulse appears at the output of the flip flop 118.

The process just described continues, with a sector pulse being generated after each 50 counts of the CSYNC pulses (whereas it was previously 100), until the counter 102 has counted 4,152 pulses. At this point, the P input to the comparator 104 becomes greater than Q2, and the resulting signal at the output of the comparator 104 inhibits generation of further sector pulses by the flip flop 118 until the counter 102 is reset by the next INDEX pulse.

Figure 7:
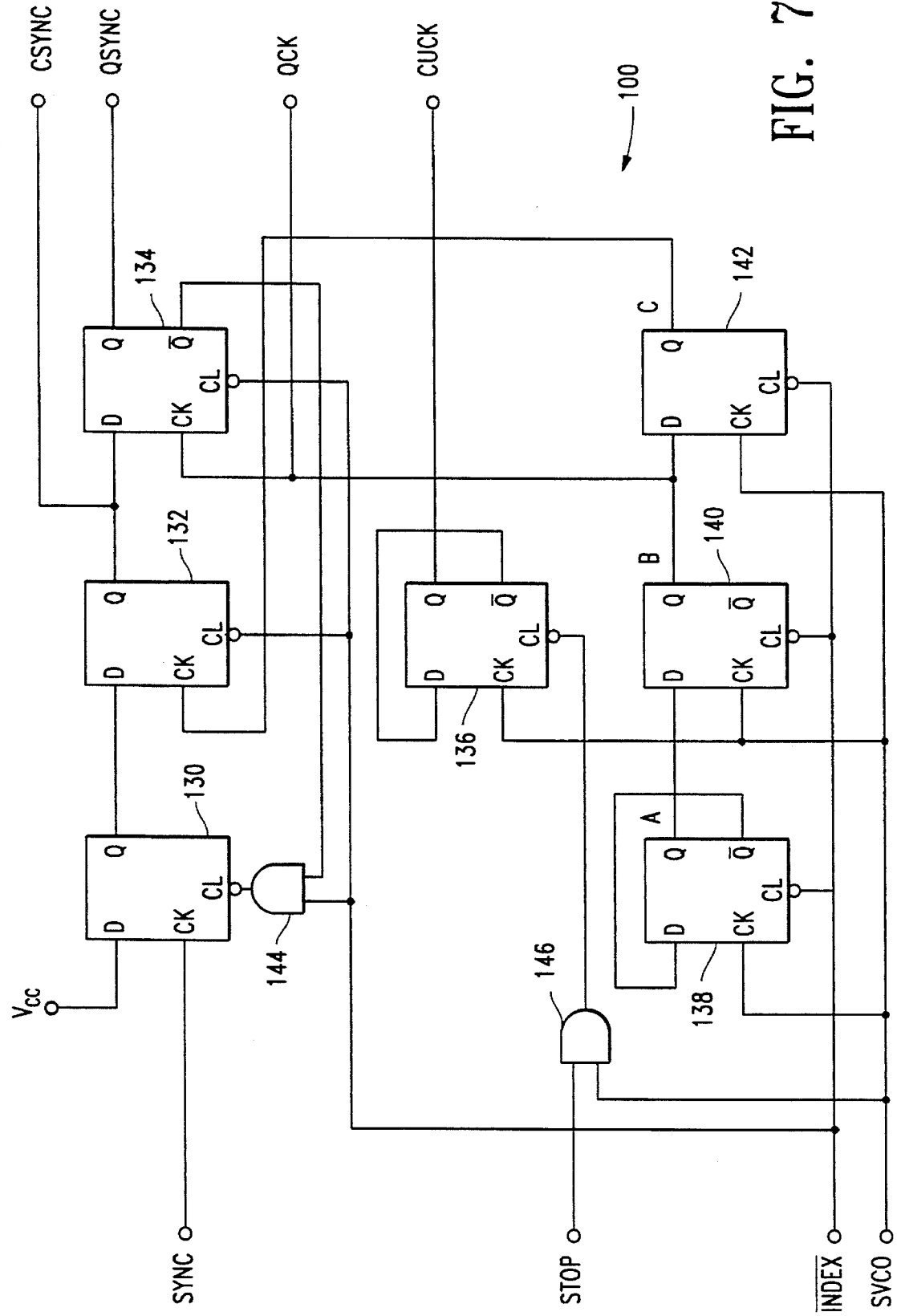
FIG. 7 is a schematic diagram of the clock generator in the programmable sector pulse generator of FIG. 6.

FIGS. 8A–8H illustrate signals occurring at various locations throughout the programmable sector pulse generator 38 of FIG. 6 and the included clock generator 100 of FIG. 7. FIG. 8A shows the INDEX signal, which as previously noted comprises one pulse for each revolution of the servo disk. The SYNC signal shown in FIG. 8B comprises a series of pulses contained within the track following signals and generated by the phase locked loop 96. One such pulse is shown in FIG. 8B (as discussed above there are 4,166 pulses per revolution in the present example). The SVCO signal shown in FIG. 8C comprises a series of pulses occurring at the rate of 8 MHz in the present example. The SVCO pulses are related to the SYNC pulses, inasmuch as the SYNC pulses occur at the rate of SVCO/32. These clock signals are synchronized with rotation of the motor used to drive the servo disk and the data disks.

The INDEX, SYNC and SVCO signals of FIGS. 8A–C are applied to the clock generator 100 together with the STOP signal from the flip flop 114. The clock generator 100 is shown in detail in FIG. 7.

As shown in FIG. 7, the clock generator 100 includes three flip flops 130, 132 and 134, a flip flop 136, and three more flip flops 138, 140 and 142. The INDEX signal is applied to the clear (CL) inputs of the flip flops 132, 134, 138, 140 and 142. The INDEX is also applied to an AND gate 144 together with the Q output of the flip flop 134, and the output of the AND gate 144 is coupled to the clear input of the flip flop 130. The INDEX signal is combined by an AND gate 146 with the STOP signal, and the output of the AND gate 146 is coupled to the clear input of the flip flop 136.

The SYNC signal from the phase locked loop 96 is applied to the clock (CK) input of the flip flop 130. The Q output of the flip flop 130 is provided to the D input of the flip flop 132. The clock input of the flip flop 132 is provided by the Q output of the flip flop 142. The Q output of the flip flop 132, which comprises the CSYNC signal, is provided to the D input of the flip flop 134 to provide the QSYNC signal at the Q output of the flip flop 134.

The SVCO signal provides the clock input of the flip flops 136, 138, 140 and 142. The D input of the flip flop 138 is provided by the Q output thereof. The Q output (A) of the flip flop 138 provides the D input of the flip flop 140. The Q output (B) of the flip flop 140 provides the D input of the flip flop 142. The Q output (C) of the flip flop 142 provides the clock input of the flip flop 132. The B signal at the Q output of the flip flop 140 provides the QCK signal in addition to the clock input of the flip flop 134.

The flip flop 136 which receives the SVCO signal at its clock input, receives the Q output therefrom at the D input. The Q output of the flip flop 136 provides the count up or CUCK signal.

FIGS. 8D, 8E and 8F respectively illustrate the A, B and C signals at the Q outputs of the flip flops 138, 140 and 142, respectively. These signals function to produce the STOP and SYNC active timing shown in FIG. 8G and the counter up (CSYNC) and CUCK active timing shown in FIG. 8H. The arrows in FIG. 8G correspond to the simultaneous occurrence of the STOP and SYNC signals. The arrows in FIG. 8H correspond to the simultaneous occurrence of the counter up (CSYNC) signal and the count up (CUCK) signal.

FIG. 9B shows the sector pulses produced by the programmable pulse generator 38 in conjunction with the INDEX pulses which are shown in FIG. 9A. As previously described, an INDEX pulse is generated at the beginning of each revolution of the servo disk. Two such pulses are shown in FIG. 9A. The sector pulse generator 38 of FIG. 6 responds to the INDEX pulses and the other timing signals to produce the sector pulses at the Q output of the flip flop 118. As shown in FIG. 9B, the sector pulses occur at intervals of "t" which vary with the zone of the addressed servo track as previously described. A final sector pulse 149 which is shown in dotted outline and which would otherwise be generated is inhibited by the operation of the comparator 104 of FIG. 6. The purpose of this is to avoid generation of a sector pulse in which there would be insufficient space to provide a full sector prior to the next $\overline{\text{INDEX}}$ pulse.

The INDEX and SYNC pulses are respectively shown in FIGS. 8A and 8B in conjunction with the waveforms of FIGS. 8C–8H. Because of the timing of such other waveforms, only a single SYNC pulse is shown in FIG. 8B.

FIG. 10A shows a succession of the SYNC pulses occurring over a revolution of the servo disk, in conjunction with the INDEX pulses which are shown in FIG. 10B. Again, an INDEX pulse is generated at the start of each disk revolution. The SYNC pulses which occur at a much greater frequency (4,166 per revolution) are generated in response to rotation of the servo disk.

The programmable sector pulse generator 38 of FIG. 6 generates sector pulses to identify or define the successive sectors along the servo track being addressed by the servo transducer in accordance with the zone of the track, as previously described.

FIG. 11 illustrates a portion of a data disk in which a first data track 150 which lies within a zone A is at a distance r from a center 152 of the disk. A second data track 154 which lies within a zone B is a distance 2r from the center 152. A sector 156 lying along the first data track 150 and having a standard length 1 corresponds to a sector defined by dotted lines 158 and 160. A sector 162 which is also of the standard length 1 lies along the second data track 154. As shown in FIG. 11, because the track 150 is twice the distance or 2r from the center 152 as compared with the track 150 which is at the distance r, the arcuate extent or rotational angle of the sector 156 within the inner zone A encompasses two sectors within the outer zone B. Therefore, the sector pulses of the outer track 154 are generated at twice the frequency and have one half the period of the sector pulses for the track 150. This is illustrated in FIGS. 12A–12D. Two hundred and fifty six (256) bytes are recorded in each sector, and the linear recording density remains generally constant from zone to zone.

FIG. 12A illustrates a pair of sector pulses 164 and 166 for the track 150 which are separated by a period t. FIG. 12B shows the data area 156 having a standard length 1 and comprising 256 bytes. Because the data area 156 is at a distance r from the center 152, the bits within the data area 156 and the corresponding track 150 occur at the rate of 10 Mbps as the disk rotates relative to the servo transducer.

FIG. 12C shows the sector pulses for the track 154 and the included data area 162 which are at twice the distance or 2r from the center 152. FIG. 12C shows two successive sector pulses 168 and 170 which have a period of t/2. The data area 162 is shown in FIG. 12D and also has the standard length 1 of 256 bytes. Because the 256 bytes of the data area 162 are recorded at the same density at the 256 bytes of the data area 156 but at twice the distance or 2r from the center 152 when compared with the data area 156 which is within the track 150 at a distance r from the center 152, the data area 162 passes at twice the speed of the data area 156. Therefore, whereas the data area 156 has a transfer rate of 10 Mbps, the data area 162 will have a transfer rate of 20 Mbps.

Figure 13:
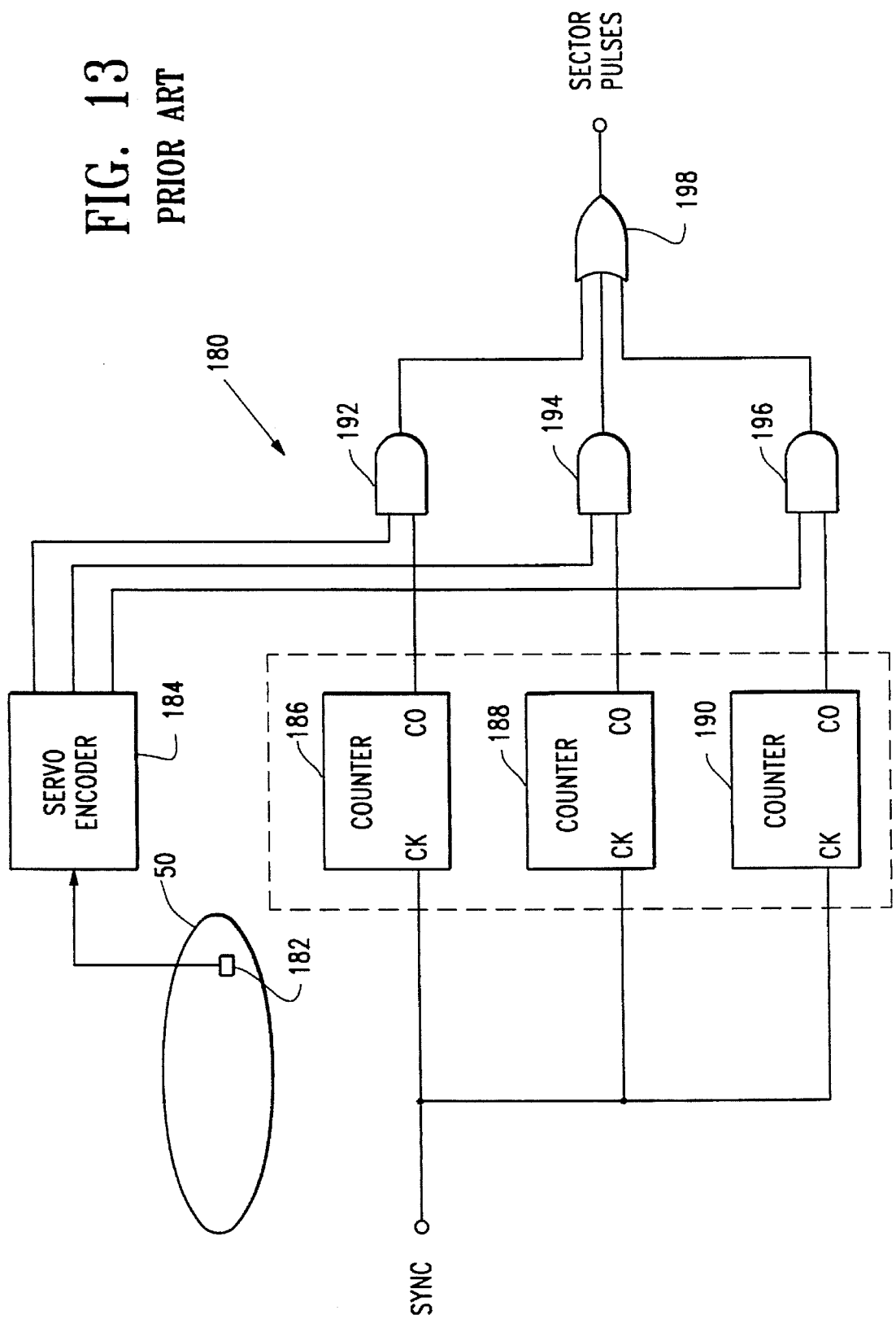
FIG. 13 is a block diagram of a conventional sector pulse generating arrangement in a zone bit recording system.

The advantages of the programmable sector pulse generator 38 in accordance with the invention can be better appreciated by considering a conventional sector pulse generating arrangement. Such an arrangement 180 is shown in FIG. 13. The arrangement 180 includes the conventional servo disk 50 shown in FIG. 3. As previously described in connection with FIG. 3, the servo disk 50 has the three predefined zones 54, 56 and 58 which require generation of the sector pulses at three different frequencies to define the sectors along the tracks of the three different zones 54, 56 and 58.

A magnetic transducer 182, which is positioned at a selected one of the servo tracks 52 on the servo disk 50, is coupled to a servo encoder 184 which identifies the zone of a particular track 52 being addressed by the transducer 182. Each of the tracks 52 includes a series of the zone data fields 42 shown in FIG. 2 which identify the particular zone in which the track is located. The transducer 182 reads the zone data fields 42 within the particular track 52 being addressed thereby, and the servo encoder 184 responds by determining the particular one of the zones 54, 56 and 58 on the servo disk 50 in which the track being addressed by the transducer 182 is located. The servo encoder 184 selects the particular one of three different counters 186, 188 and 190 which is associated with the particular one of the zones 54, 56 and 58 identified by the servo encoder 184. The servo encoder 184 accomplishes this selection by enabling one of the inputs of the particular one of three different AND gates 192, 194 and 196 respectively coupled to the carry out (CO) outputs of the counters 186, 188 and 190 (dividers having different divider rates). Each of the counters 186, 188 and 190 has the clock (CK) input thereof coupled to receive the SYNC pulses generated by rotation of the servo disk 50.

In the particular arrangement 180 of FIG. 13, the counter 186 is associated with the outermost zone 58, and is operative to provide a pulse at the carry out output thereof in response to each forty SYNC pulses received at the clock input thereto. Thus, the counter 186 is fixed to continuously count to forty and provides a signal to a second input of the AND gate 192 each time forty SYNC pulses have been counted. The counter 188 which corresponds to the middle zone 56 of the servo disk 50 performs a fixed count of fifty, so as to provide a signal to a second input of the AND gate 194 each time the count therein reaches fifty. The counter 190 which corresponds to the innermost zone 54 produces a signal at a second input of the AND gate 196 each time sixty SYNC pulses have been counted.

As noted, the signals produced at the CO outputs of the counters 186, 188 and 190 are applied to the second inputs of the AND gates 192, 194 and 196, respectively. The servo encoder 184, which identifies the particular one of the zones 54, 56 and 58 being addressed by the transducer 182, acts to pass the signals produced at the CO output of the corresponding one of the counters 186, 188 and 190 to an OR gate 198 by enabling the first input of the particular one of the AND gates 192, 194 and 196 associated with the selected counter. The OR gate 198 provides the signals as the sector pulses at an output thereof.

It will be seen that in the conventional arrangement 180 of FIG. 13, the counters 186, 188 and 190 are dedicated counters with each performing a fixed count corresponding to one of the predefined zones in the servo disk 50. Inasmuch as a separate counter is required for each zone, the expense of and the space consumed by the separate counters can be substantial, particularly in situations where a large number of zones are employed. While only three zones are shown and described in connection with FIGS. 3 and 13, optimum data density may dictate that a larger number of zones be used with an even greater increase in the expense of and the space consumed by the fixed counters associated with the various zones.

While various forms and modifications have been suggested, it will be appreciated that the invention is not limited thereto but encompasses all expedients and variations falling within the scope of the appended claims.

What is claimed is:

1. Magnetic disk apparatus comprising the combination
   at least one magnetic disk having a plurality of tracks thereon;
   a programmable sector pulse generator, the sector pulse generator generating sector pulses identifying the angular locations of a succession of sectors along a selected one of the plurality of tracks on the at least one magnetic disk, the sector pulse generator including a programmable counter, wherein the counter provides a count signal representative of a predetermined amount of rotation of the magnetic disk and provides sector pulses of desired angular spacing in response to the count signal, the desired angular spacing of the sector pulses being variable by the counter to vary the angular extents of the succession of sectors;
   means responsive to selection of a desired one of the plurality of tracks on the at least one magnetic disk for selecting the variable desired angular spacing of the sector pulses in accordance with the desired track selected by adjusting the programable counting means;
   means for providing timing signals to the programmable sector pulse generator in response to rotation of the at least one magnetic disk; and
   a latch for receiving a repeating count down value from the means for selecting, a full adder coupled to the latch and operative to store a desired total count value, and a first comparator coupled to the counter and the full adder for generating a sector pulse each time the counter has counted to the desired total count value.

2. Apparatus in accordance with claim 1, further including means responsive to the counter and to the desired total count value for entering the desired total count value previously stored by the full adder in the full adder for combining with the repeating count down value in the latch whenever the counter has counted to a value greater than the desired total count value in the full adder.

3. Apparatus in accordance with claim 2, wherein the means responsive includes a latch coupled in parallel with the full adder for storing the desired total count value from the full adder, a flip flop for providing a stop signal when the counter has counted to a value greater than the desired total count value in the full adder, and means responsive to the stop signal for providing a count up signal to the latch to enter the desired total count value stored in the latch in the full adder.

4. Apparatus in accordance with claim 1, further including a second latch for receiving from the means for selecting representing a value a maximum number of timing signals per revolution of the at least one magnetic disk, and a second comparator coupled to the counter and the second latch for inhibiting generation of a sector pulse when the counter has counted to a value greater than the value received in the second latch from the means for selecting.

5. Apparatus in accordance with claim 4, further including a flip flop coupled to the first-mentioned comparator and to the second comparator and operative to generate a sector pulse each time the counter has counted to the desired total count as determined by the first-mentioned comparator, except when the second comparator determines that the counter has counted to a value greater than the value received in the second latch from the means for selecting.

6. Magnetic disk apparatus comprising the combination of:
   a servo disk having a plurality of tracks thereon;
   a plurality of data disks, each having a plurality of tracks thereon corresponding to the plurality of tracks on the servo disk;
   a magnetic head arrangement for positioning a plurality of magnetic heads at different tracks on the servo disk and the plurality of data disks, the magnetic head arrangement being operative to address a selected track on the servo disk and corresponding tracks on the plurality of data disks simultaneously;
   a read/write control for positioning the magnetic head arrangement at selected locations on the servo disk and the plurality of data disks;
   a programmable sector pulse generator comprising a in single counting circuit which generates a count representative of rotation of the disks, and which generates sector pulses defining successive sectors along the tracks of the plurality of data disks in accordance with the count; and
   a processor coupled to the magnetic head arrangement, the processor generating a predetermined count value in accordance with the locations of tracks on the servo disk and the plurality of data disks addressed by the magnetic head arrangement, wherein the programmable sector pulse generator is coupled to receive the predetermined count value from the processor.
   wherein the programmable sector pulse generator further comprises a variable count monitoring arrangement which is programmed to repeatedly respond to the predetermined count determined by the processor, the programmable sector pulse generator generating a sector pulse each time the counting circuit counts the predetermined count.

7. Apparatus in accordance with claim 6, wherein the counting circuit is operative to count timing signals generated in response to rotation of the servo disk.

8. Apparatus in accordance with claim 6, wherein the processor includes means for detecting track crossings on the servo disk by the magnetic head to determine the zone of a track on the servo disk addressed by the magnetic head arrangement.

9. Apparatus in accordance with claim 6, wherein the processor is operative to reprogram the sector pulse generator in response to a track seek command within a time period substantially less than the time required for a revolution of the servo disk.

10. Magnetic disk apparatus comprising the combination of:
    a servo disk having a plurality of tracks thereon;
    plurality of data disks, each having a plurality of tracks thereon corresponding to the plurality of tracks on the servo disk;

a magnetic head arrangement for positioning a plurality of magnetic heads at different tracks on the servo disk and the plurality of data disks, the magnetic head arrangement being operative to address a selected track on the servo disk and corresponding tracks on the plurality of data disks simultaneously;

a read/write control for positioning the magnetic head arrangement at selected locations on the servo disk and the plurality of data disks;

a programmable sector pulse generator comprising a single counting circuit which generates a count representative of rotation of the disks, and which generates sector pulses defining successive sectors along the tracks of the plurality of data disks in accordance with the count; and a processor coupled to the magnetic head arrangement, the processor generating a predetermined count value in accordance with the locations of tracks on the servo disk and the plurality of data disks addressed by the magnetic head arrangement, wherein the programmable sector pulse generator is coupled to receive the predetermined count value from the processor, wherein the processor defines a plurality of different concentric zones of the plurality of tracks on the servo disk and the plurality of data disks by defining a different predetermined count value for the programmable sector pulse generator for each of a plurality of different groups of the plurality of tracks on the servo disk and the plurality of data disks.

11. Magnetic disk apparatus comprising the combination of:

at least one magnetic disk having a plurality of tracks thereon;

a programmable sector pulse generator for generating sector pulses identifying the locations of a succession of sectors along a selected one of the plurality of tracks on the at least one magnetic disk, the sector pulse generator including programmable counting means for providing a count signal representative of a predetermined amount of rotation of the magnetic disk and for providing sector pulses of desired spacing in response to the count signal;

means for providing timing signals to the programmable sector pulse generator in response to rotation of the at least one magnetic disk; and means responsive to selection of a desired one of the plurality of tracks on the at least one magnetic disk for selecting a desired total count value in accordance with the desired track selected by adjusting the programmable counting means;

wherein the programmable counting means includes a counter for counting the timing signals, a latch for receiving a repeating count down value from the means for selecting, a full adder coupled to the latch and operative to store the desired total count value, and a comparator coupled to the counter and the full adder for generating a sector pulse each time the counter has counted to the desired total count value.

12. Apparatus in accordance with claim 11, further including means responsive to the counter and to the desired total count value for resetting the full adder to the desired total count value for combining with the repeating count down value in the latch whenever the counter has counted to a value greater than the desired total count value in the full adder.

13. Apparatus in accordance with claim 12, wherein the means responsive includes a latch coupled in parallel with the full adder for storing the desired total count value from the full adder, a flip flop for providing a stop signal when the counter has counted to a value greater than the desired total count value in the full adder, and means responsive to the stop signal for providing a count up signal to the latch to enter the desired total count value stored in the latch in the full adder.

14. Apparatus in accordance with claim 11, further including a second latch for receiving from the means for selecting a value representing a maximum number of timing signals per revolution of the at least one magnetic disk, and a second comparator coupled to the counter and the second latch for inhibiting generation of a sector pulse when the counter has counted to a value greater than the value received in the second latch from the means for selecting.

15. Apparatus in accordance with claim 14, further including a flip flop coupled to the first-mentioned comparator and to the second comparator and operative to generate a sector pulse each time the counter has counted to the desired total count as determined by the first-mentioned comparator, except when the second comparator determines that the counter has counted to a value greater than the value received in the second latch from the means for selecting.

* * * * *